Oct. 23, 1951   B. HOPPE   2,572,151
STORING AND SERVING DEVICE BY MEANS OF WHICH FOOD
MAY BE WARMED AND/OR COOKED
Original Filed March 13, 1943   4 Sheets-Sheet 1
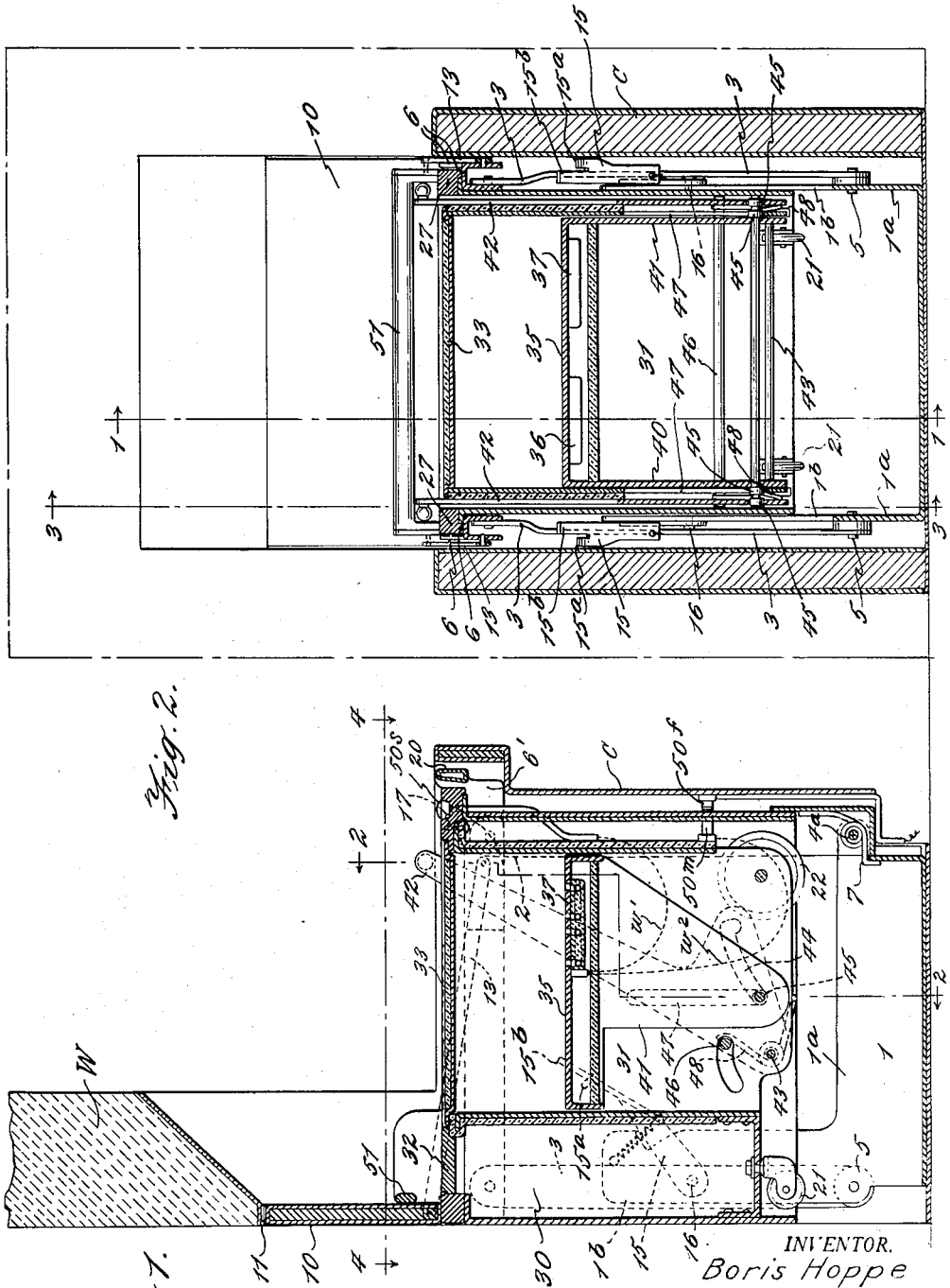
INVENTOR.
Boris Hoppe
BY
Gifford, Scull & Burgess
ATTORNEYS

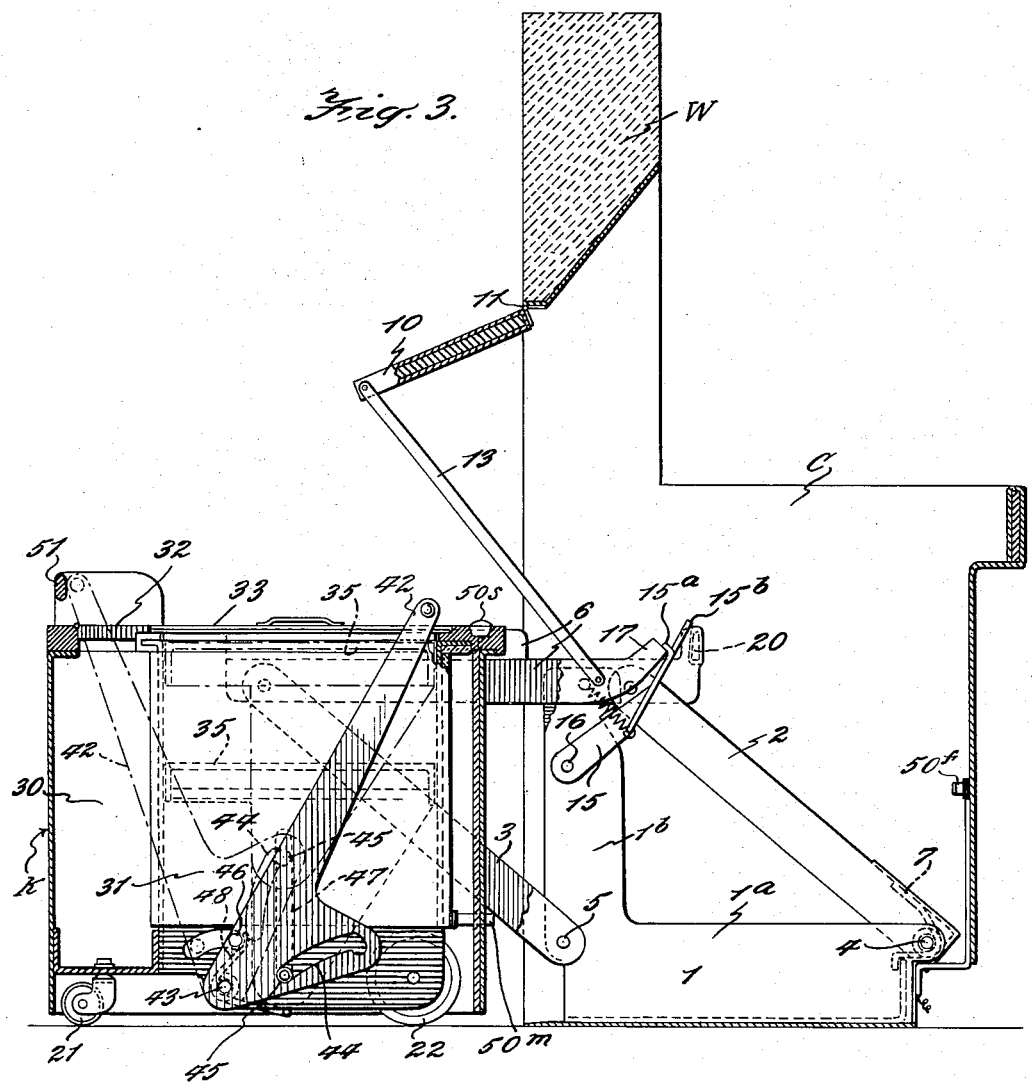
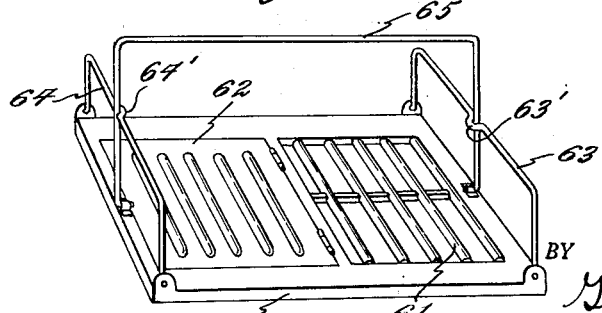
INVENTOR.
Boris Hoppe
BY
ATTORNEYS

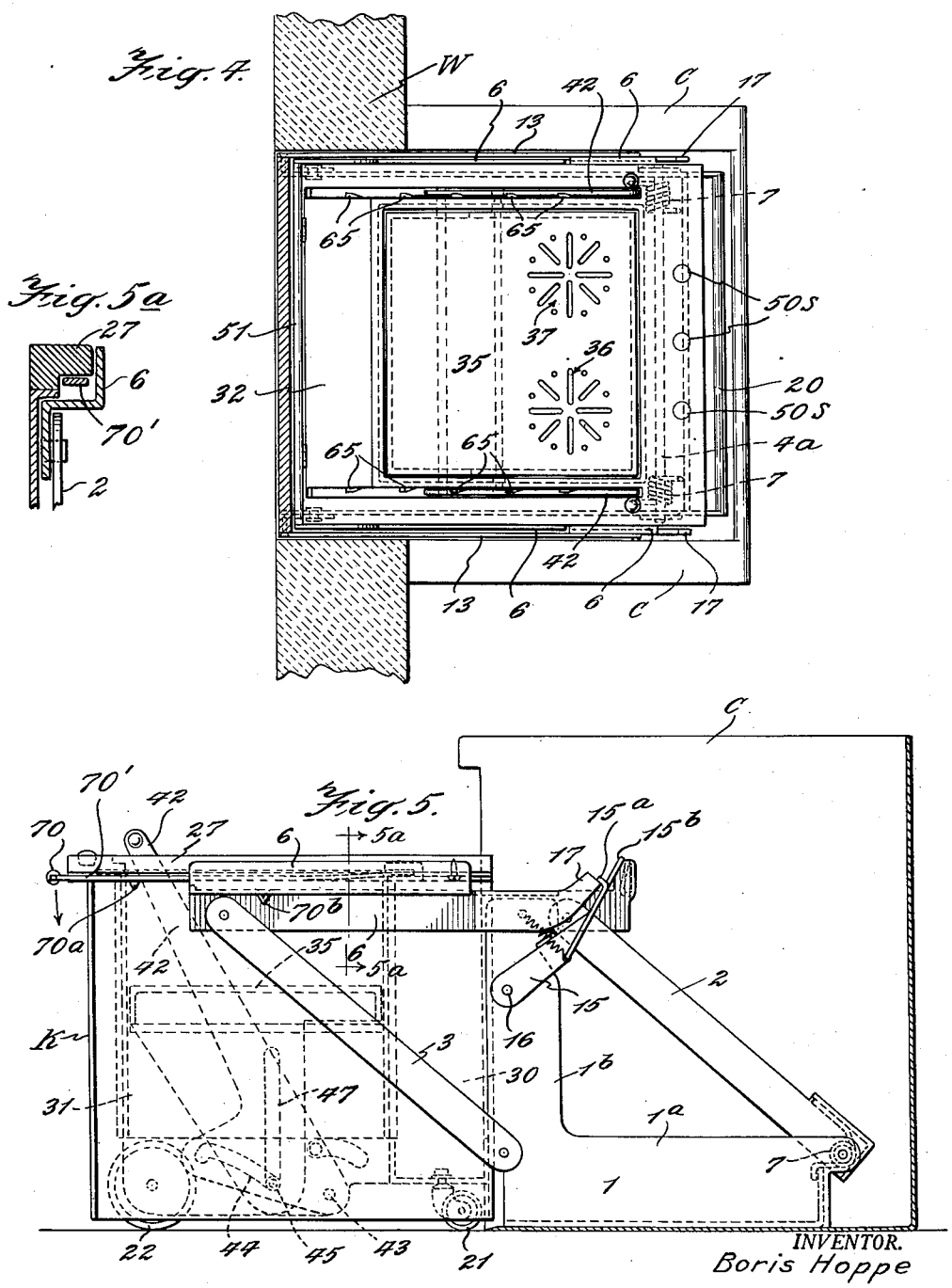

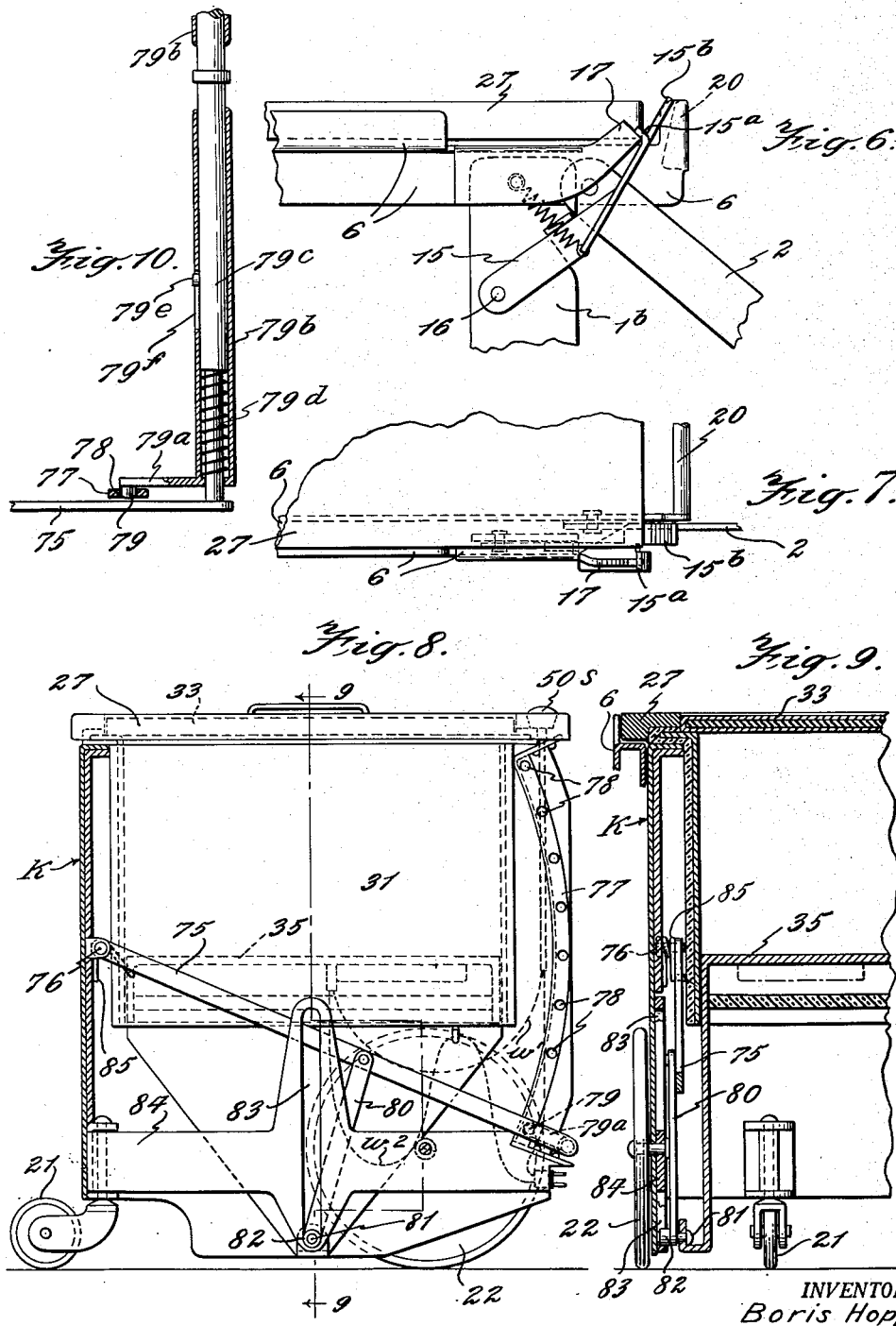

Patented Oct. 23, 1951

2,572,151

UNITED STATES PATENT OFFICE 2,572,151

STORING AND SERVING DEVICE BY MEANS OF WHICH FOOD MAY BE WARMED AND/OR COOKED

Boris Hoppe, Kew Gardens, N. Y.

Original application March 13, 1943, Serial No. 479,043. Divided and this application November 9, 1944, Serial No. 562,600

7 Claims. (Cl. 20—1.11)

This is a division of my application Serial No. 479,043 for "Food Serving Device," filed March 13, 1943, now abandoned.

The invention relates to a combination stove and food service wagon.

An object of the invention is to provide for positioning the device in the kitchen at the normal height of a cooking stove or working table and for delivering the device to the dining room at a suitable level for serving the food at the dining room table.

In the drawings:

Fig. 1 is a vertical section taken through line 1—1 of Fig. 2;

Fig. 2 is a vertical section taken through line 2—2 of Fig. 1;

Fig. 3 is a vertical section taken through line 3—3 of Fig. 2 showing the server in lowered position;

Fig. 4 is a horizontal section taken through line 4—4 of Fig. 1;

Fig. 5 is a vertical side elevation of a modification of the device designed to be moved from the kitchen to the dining room through the ordinary door instead of through an opening in a partition wall;

Fig. 5a is a section through line 5a—5a of Fig. 5;

Fig. 6 is a side view of the catch mechanism which is designed to hold the pivoted framework in its lowermost position;

Fig. 6a is a perspective view of a combination toaster and tray;

Fig. 7 is a plan view of the catch mechanism shown in Fig. 6;

Fig. 8 is a modification of the device showing another form of mechanism for raising and lowering the stove to convert it from a flat top stove to an oven;

Fig. 9 is a section through line 9—9 of Fig. 8;

Fig. 10 is a fragmentary plan view, partly in section, of operating handle of embodiment shown in Figs. 8 and 9.

Looking at the drawings, W is a partition wall between a kitchen and dining room. C is a cabinet designed to receive the combination server and range and the mechanism for raising and lowering the same. This cabinet may be built into and made part of the kitchen equipment and preferably is designed to accommodate itself in construction, design, and appearance to the other units in the kitchen. Within the cabinet C is a framework 1 (Fig. 1) which comprises a pair of L-shaped members, one on each side of the cabinet C. Each of these members 1 has a horizontal portion $1^a$ which is disposed near the floor of the kitchen, and a vertical portion $1^b$. Pivoted to the ends of each of the horizontal portions $1^a$ are a pair of arms shown at 2 and 3. Arm 2 is pivoted to member $1^a$ at 4, and arm 3 is pivoted at the other end of the same member at 5. Pivots 4 are formed by the ends of a bar $4^a$ (Fig. 4) which runs from one side to the other of the framework. Pivots 5 project from framework $1^a$.

Connecting the upper ends of both pairs of arms 2 and 3 are horizontal tracks 6. A counterbalance spring 7 is wound around the pivot points 4 and arranged so as to normally urge the arms 2 and 3 into their vertical position, as shown in Fig. 1. These springs will serve to counterbalance the weight of the device so that little effort is required to move it from its lowered position as shown in Fig. 3 to its raised position shown in Fig. 1.

A wall panel 10 is hinged to wall W at its upper edge 11 so that it can swing outwardly toward the dining room when the serving device is being removed from or returned to the kitchen cabinet. A pair of levers 13 pivotally connect the lower end of panel 10 to tracks 6 so that when tracks 6 are moved from the position shown in Fig. 1 to the position shown in Fig. 3, the levers 13 will serve to move the hinged panel 10 to the position shown in Fig. 3.

A pair of catches are mounted on the stationary framework 1, as shown at 15. Catches 15 are pivoted at 16 to the vertical members $1^b$ of the frame 1, and drawn towards said members by springs $15^c$. Each catch 15 includes an inturned member $15^a$ (Figs. 6 and 7) and a straight member $15^b$. The member $15^a$ is designed to cooperate with an extension 17 attached to tracks 6. A handle bar 20, secured to opposite sides of tracks 6, is spaced from the front edge of cabinet C, as shown in Fig. 1, sufficiently far so that the operator of the device can push the handle bar 20 toward the dining room when it is desired to move the device from the kitchen to the dining room.

The combination serving device and stove comprises a four-walled box-like cabinet K. The server is designed to roll on suitable casters shown at 21 and 22 when the server is on the dining room floor. Two opposite upper edges of the cabinet are equipped with flanges 27 adapted to rest on the tracks 6 and when so positioned, with the movable framework raised as shown in Fig. 1, to support the weight of the server and range.

The interior of the server is divided into two compartments 30 and 31. These compartments are equipped with removable covers 32 and 33, respectively. The cover 33 may be placed inside the compartment 30 when not in use. The compartment 31 is insulated and contains the flat vertically movable stove portion 35, which includes the electric heating devices 36 and 37. The flat top portion 35 is supported on vertically disposed walls 40 and 41 and made integral therewith. This stove may be raised and lowered within the compartment 31 by means of suitable mechanism connected to the levers 42. These levers 42 are located one on each side of the device and are pivoted to the framework of the cabinet K at 43. Levers 42 are connected by rod 46. On each lever 42 is a cam slot 44 in which a roller cam 45 is intended to operate. The roller cams are attached to the side members 40 and 41 which support the horizontal stove top 35. These cam rollers 45 are arranged to operate not only in the cam slot 44, but also in a vertically disposed slot 47 which is cut into a part of the framework of the cabinet K. A pair of counterbalanced springs are shown at 48. These are arranged around the pivot point 43 and in relation to the lever 42 so as to assist in raising the stove member within the compartment 31.

At $50^m$ is shown one part of an electric switch adapted to engage a complemental part $50^f$ so that, when the serving device and stove is in the position shown in Fig. 1, this switch is closed and the resistance coils of the stove are connected into the house circuit for use. If desired, the switch portion $50^m$ may be plugged into a suitable socket on the end of a long flexible cord so that the stove device may be used after the combination server and stove has been removed from the cabinet C and is in use in the dining room.

At $50^s$ is a hand operated switch connected to the stove and $50^m$ by wires $w^1$ and $w^2$. At 51 is shown a bar type of handle which may be used to move the server around when it is supported on its wheels, and this bar also serves to limit the motion of the lever 42, as shown in the dot-dash lines of Fig. 3.

In Fig. 6a is shown a toaster and dish rack. It comprises a bottom portion 60 equipped with a grilled opening 61 in a flat hinged metal door 62 adapted to close off either half of the grilled opening 61 to make a flat plate. Hinged side pieces 63 and 64 may be folded down on the portion 60, and hinged handle 65 is designed to carry the tray and also to offer a support to the side members 63 and 64 when they are raised. This combination toaster and rack is so proportioned that it may be dropped into the compartment 31 and rested upon the top of the stove 35. It may be used as a grill or toasting rack or it may be used as a tray for dishes, either clean dishes or used dishes. Side members 63 and 64 are equipped with notches found by offsets 63' and 64'. These notches are designed to grip the handle 65 to hold the side member upright.

Normally, the combination server stove rests inside the cabinet C in the kitchen, as shown in Fig. 1. With the cover 33 in place, the top of this device serves as a kitchen table. With the cover removed, the stove may be used. When the stove is in its raised position shown in dotted lines in Fig. 3, it may be used as an ordinary flat top kitchen stove. When it is in its lowermost position as shown in Fig. 1, with the cover in place, the space above the stove may be used as an oven. Suitable notches shown in Fig. 4 at 65 in the side of the cabinet K are designed to hold the lever 42 in any intermediate position desired.

After the meal has been cooked in the device or on a separate kitchen stove, it may be kept in the compartment 31 on top of the flat stove portion 35, which latter may be placed at any suitable level and then the device is ready to be pushed into the dining room for service of the meal. This is accomplished by pushing the device to the left, as seen in Figs. 1 and 3, by pressure on the bar 20 by an operator standing in the kitchen. When the framework to which the bar 20 is attached moves toward the position shown in Fig. 3, the panel 10 is lifted, the server moves into the direction of the dining room, down onto its wheels and may be then wheeled into the dining room. When the frame reaches its lowermost position, the member 15a of catch 15 engages the member 17 on the rail 6 so as to hold the supporting framework in the position shown in that figure. The operator may then go around into the dining room and move the server out to any position for service of the meal.

After the meal is served, the dishes can be put back into the compartment 31 on top of the stove 35 and covered up. The dishes may be put into the rack shown in Fig. 6a and this put on top of stove. The server may then be pushed back into the position shown in Fig. 3 and then pushed still further in the direction of the kitchen along the rails 6 until the forward edge of the serving device engages the member 15b of the catch 15. This will cause the catch 15 to rotate clockwise about the pivot 16, as seen in Fig. 6, and thus serve to disengage the part 15a of the catch from the member 17 on the rail 6. This will permit the arms 2 and 3 to move clockwise toward the position seen in Fig. 1 and in so doing they will raise the serving device and move it back into the cabinet C. The panel 10 will drop into place and the device will be returned to the kitchen as shown in Fig. 1. The dish rack with used dishes may then be removed from the stove.

A modification of the invention is shown in Fig. 5 where the various elements numbered the same as those in Figs 1 to 4 function in the same manner and the description thereof will not be repeated. This device is very similar to that which has already been described except that cabinet K is intended to be moved from cabinet C out into the kitchen and then wheeled through the kitchen door into the dining room.

In operation, the handle bar 70 is grasped by the operator and drawn outwardly into the kitchen. The supporting framework made up in part by the arms 2 and 3 and the rails 6 move in a counterclockwise direction into the position shown in Fig. 5, bringing the server outwardly from the cabinet C and at the same time bringing it down onto the kitchen floor. The server may then be withdrawn from the supporting rails 6 and wheeled out through the kitchen door into the dining room. Handle 70 is mounted on cantilever levers 70' attached to the underside of flanges 27. Each lever is equipped with a projection 70a adapted to cooperate with detents 70b in tracks 6. This cooperation permits the server to be pulled out of the cabinet by handle 70 without moving the supporting framework and server relative to each other until the server rests on the floor. When the server reaches the floor, downward pressure on handle 70 will move the supporting framework downwardly far enough to lock it in place with catch 15. In this position, tracks 6, are disengaged from flanges 27 far enough to permit the server to roll out into the kitchen and back again. When server is pushed back into place on the supporting frame, it will go far enough to trip catch 15, thus permitting the framework to rise.

In Figs. 8 and 9 is shown another modification illustrating another method of raising and lowering the stove element within the compartment 31. In this device there are two levers 75 pivoted near one edge of the cabinet K, as shown at 76. The other ends of these levers are designed to be moved up and down over an arcuate slide 77 equipped with holes 78 designed to cooperate with a pin 79 on arm 79ª attached to hollow handle 79ᵇ slidable on rod 79ᶜ outwardly from the center of rod 79ᶜ or downwardly, as seen in Fig. 10. A pin 79ᵉ operating in a slot 79ᶠ permits sliding motion but prevents rotation of handle 79ᵇ on rod 79ᶜ. Levers 75 are connected by links 80 to longitudinally arranged pins 81 equipped with rollers 82 at each end, which are designed to slide up and down in vertically arranged slots 83 cut in framework members 84. The pins 81 are attached to the stove 35 in a suitable manner so that as the pins 81 with their rollers move up and down in slot 83, the stove is raised and lowered. A balance spring 85 tends to counterbalance the weight of stove 35 and assist in raising it.

The compartment of the serving device may be equipped with a vertically movable bottom without heating elements therein if so desired. The vertical adjustability of the bottom of the compartment is advantageous in serving at the dining room table from deep dishes, such as a soup tureen or the like, because with this construction it is possible to arrange the top of the food container at approximately the same level as the top of the server.

While I have shown the invention as embodied in a specific form, it is to be understood that various changes in details may be made without departing from the scope of the invention as defined by the appended claims.

I claim:

1. In a food serving device comprising an outer cabinet having tracks disposed in the upper inside portion thereof, the combination therewith of an inner cabinet supported on said tracks at a point above the bottom of said outer cabinet, link members pivotally fastened to the outer cabinet and to said tracks, said link members enabling said inner cabinet to be swung from a first position inside said outer cabinet to a second position outside of and on the same bottom level as said outer cabinet, co-operating means secured to said outer cabinet and to said tracks adapted to retain said link members in a position corresponding to said second position, and means by which the inner cabinet may be removed from the tracks.

2. In a food serving device comprising an outer cabinet having tracks therein and an inner cabinet supported on said tracks, the combination therewith of a partition wall having an opening through said wall, said outer cabinet having its sides enclosing said opening, said wall having a section swingably mounted thereon above the inner cabinet and covering said opening, a first means pivotally connecting said tracks and said section adapted to swing said section above the inner cabinet in response to movement of said tracks, a second means pivotally connecting said tracks and said outer cabinet and adapted to support said tracks, said second means enabling said inner cabinet to be swung from a first position inside said outer cabinet through said opening to a second position outside of and on the same bottom level as said outer cabinet.

3. In a food serving device comprising an outer cabinet having tracks disposed in the upper inside portion thereof, the combination therewith of an inner cabinet supported on said tracks at a point above the bottom of said outer cabinet, means pivotally connecting said tracks and said outer cabinet and enabling said inner cabinet to be swung from a first position inside said outer cabinet to a second position outside of and on the same bottom level as said outer cabinet, and co-operating means associated with said outer cabinet and said tracks and adapted to retain the inner cabinet in said second position.

4. In a food serving device comprising an outer cabinet having tracks disposed in the upper inside portion thereof, the combination therewith of an inner cabinet supported on said tracks at a point above the bottom of said outer cabinet, means pivotally connecting said tracks and said outer cabinet and enabling said inner cabinet to be swung from a first position inside said outer cabinet to a second position outside of and on the same bottom level as said outer cabinet, co-operating means associated with said outer cabinet and said tracks and adapted to retain the inner cabinet in said second position, and means on said inner cabinet adapted to render said co-operating means inoperative upon movement of the inner cabinet from said second position to said first position.

5. In a food serving device comprising a stationary framework, tracks supported thereon, and a cabinet supported on said tracks and movable thereover, the combination therewith of a partition wall having an opening through said wall, a section swingably mounted on the wall and covering the opening, said section being movable to and from said opening to cover and uncover the same, a first means pivotally connecting said tracks and said section for enabling said section to be swung in response to movement of said tracks, thereby to uncover the opening, and a second means pivotally connecting said tracks and said stationary framework and adapted to support said tracks, said second means enabling said track-supported cabinet to be swung through said opening during said movement of the tracks.

6. In a device of the character described comprising an outer cabinet having tracks disposed therein and an inner cabinet supported on said tracks, the combination therewith of: pivoted members pivotally connecting said tracks with the outer cabinet; said inner cabinet and tracks being displaceable as a unit with respect to said outer cabinet in response to a displacing force applied thereto; means for locking said inner cabinet to said tracks to enable them to be displaced as a unit; latch means positioned within said outer cabinet; means adjacent one end of said tracks adapted to cooperate with said latch means to retain said inner cabinet and tracks in a displaced position; and means on said inner cabinet for unlocking and for removing the inner cabinet from the displaced tracks.

7. In a device of the character described comprising an outer cabinet having tracks disposed therein and an inner cabinet supported on and movable over said tracks, the combination therewith of: movable link members supporting said tracks and pivotally connecting the tracks with the outer cabinet, said inner cabinet and tracks being displaceable as a unit with a respect to said outer cabinet in response to a displacing force applied to said tracks, latch means in the outer cabinet; means adjacent one end of said tracks for engaging said latch means to retain said tracks in a displaced position; and means on the inner cabinet for disengaging said latch means to enable the displaced tracks to resume their original position in the outer cabinet.

BORIS HOPPE.

REFERENCES CITED

The following references are of record in the file of this patent:

UNITED STATES PATENTS

| Number | Name | Date |
|---|---|---|
| 1,317,274 | Dierkes | Sept. 30, 1919 |
| 1,475,608 | Templeton | Nov. 27, 1923 |
| 1,529,032 | Meisner | Mar. 10, 1925 |
| 1,621,387 | Warren | Mar. 15, 1927 |
| 1,729,491 | Rygl | Sept. 24, 1929 |
| 2,082,672 | Waugh | June 1, 1937 |
| 2,417,977 | French | Mar. 25, 1947 |

FOREIGN PATENTS

| Number | Country | Date |
|---|---|---|
| 268,569 | Great Britain | April 7, 1927 |